US011891511B2

(12) United States Patent
Nishimura et al.

(10) Patent No.: US 11,891,511 B2
(45) Date of Patent: Feb. 6, 2024

(54) TWO-COMPONENT CURABLE COMPOSITION FOR MANUFACTURING THERMOPLASTIC POLYURETHANE RESIN, THERMOPLASTIC POLYURETHANE RESIN, AND FIBER-REINFORCED RESIN

(71) Applicant: DAI-ICHI KOGYO SEIYAKU CO., LTD., Kyoto (JP)

(72) Inventors: Takuma Nishimura, Kyoto (JP); Yoshinori Yamada, Kyoto (JP); Kei Oikawa, Kyoto (JP)

(73) Assignee: DAI-ICHI KOGYO SEIYAKU CO., LTD., Kyoto (JP)

( * ) Notice: Subject to any disclaimer, the term of this patent is extended or adjusted under 35 U.S.C. 154(b) by 591 days.

(21) Appl. No.: 17/053,476

(22) PCT Filed: Apr. 9, 2019

(86) PCT No.: PCT/JP2019/015425
§ 371 (c)(1),
(2) Date: Nov. 6, 2020

(87) PCT Pub. No.: WO2019/216088
PCT Pub. Date: Nov. 14, 2019

(65) Prior Publication Data
US 2021/0130611 A1  May 6, 2021

(30) Foreign Application Priority Data

May 9, 2018 (JP) ................ 2018-090400

(51) Int. Cl.
| | |
|---|---|
| *C08L 75/08* | (2006.01) |
| *C08G 18/12* | (2006.01) |
| *C08G 18/32* | (2006.01) |
| *C08G 18/48* | (2006.01) |
| *C08G 18/76* | (2006.01) |
| *C08J 5/04* | (2006.01) |
| *C08K 7/26* | (2006.01) |

(52) U.S. Cl.
CPC ............. *C08L 75/08* (2013.01); *C08G 18/12* (2013.01); *C08G 18/3206* (2013.01); *C08G 18/3215* (2013.01); *C08G 18/4845* (2013.01); *C08G 18/7657* (2013.01); *C08J 5/042* (2013.01); *C08J 5/043* (2013.01); *C08J 5/046* (2013.01); *C08K 7/26* (2013.01); *C08L 2207/04* (2013.01)

(58) Field of Classification Search
CPC .... C08G 18/667; C08G 18/4879; C08L 75/08
See application file for complete search history.

(56) References Cited

U.S. PATENT DOCUMENTS

| | | | |
|---|---|---|---|
| 4,808,691 A | 2/1989 | König et al. | |
| 5,100,922 A * | 3/1992 | Wada | C08G 18/667 |
| | | | 521/107 |
| 5,185,420 A * | 2/1993 | Smith | C08G 65/2663 |
| | | | 528/65 |
| 2007/0155933 A1 | 7/2007 | Watanabe et al. | |
| 2013/0236631 A1 | 9/2013 | Matsuoka et al. | |

FOREIGN PATENT DOCUMENTS

| | | | |
|---|---|---|---|
| JP | 57-92015 A | 6/1982 | |
| JP | 63-205312 A | 8/1988 | |
| JP | 63-305127 A | 12/1988 | |
| JP | 10-330451 A | 12/1996 | |
| JP | 10-265544 A | 10/1998 | |
| JP | 11-186155 A | 6/1999 | |
| JP | 2003-287924 A | 10/2003 | |
| JP | 2005-232447 A | 9/2005 | |
| JP | 2013-189502 A | 9/2013 | |
| JP | 2018-188510 A | 11/2018 | |

OTHER PUBLICATIONS

Google translation of JP H10330451 A (Year: 2023).*
International Preliminary Report on Patentability and Written Opinion dated Nov. 10, 2020 in PCT/JP2019/015425 (submitting English translation only), 8 pages.
International Search Report dated Jul. 16, 2019 in PCT/JP2019/015425, 2 pages.

\* cited by examiner

*Primary Examiner* — Michael M Dollinger
(74) *Attorney, Agent, or Firm* — Oblon, McClelland, Maier & Neustadt, L.L.P.

(57) ABSTRACT

Provided are a two-component curable composition, for manufacture of a thermoplastic polyurethane resin, that exhibits low mixing viscosity and high glass transition temperature after curing, a thermoplastic polyurethane resin that is a cured product thereof, and a fiber-reinforced resin including the thermoplastic polyurethane resin.

The two-component curable composition for manufacture of a thermoplastic polyurethane resin is a two-component curable composition including a polyol component including a diol (A) and a polyisocyanate component including a diisocyanate (B). The diol (A) includes a diol (A-1) having an aromatic ring and having a molecular weight of 200 to 700 and a diol (A-2) having no aromatic ring and having a molecular weight of 500 or less. The ratio ((A-1)/((A-1)+(A-2))) of the mass of the diol (A-1) to the total mass of the diol (A-1) and the diol (A-2) is (10/100) to (75/100).

19 Claims, No Drawings

TWO-COMPONENT CURABLE COMPOSITION FOR MANUFACTURING THERMOPLASTIC POLYURETHANE RESIN, THERMOPLASTIC POLYURETHANE RESIN, AND FIBER-REINFORCED RESIN

TECHNICAL FIELD

The present invention relates to two-component curable compositions for manufacture of thermoplastic polyurethane resins, thermoplastic polyurethane resins, and fiber-reinforced resins.

BACKGROUND ART

Fiber-reinforced resins, having low weight and superior performance, have been used in a wide range of applications such as electrical and electronic components, vehicles, and aircraft. Thermosetting resins such as epoxy resins are often used as matrices for fiber-reinforced resins.

On the other hand, fiber-reinforced resins in which thermoplastic polyurethane resins are used as matrix resins have been developed because they can be reshaped after curing. In PTL 1, which discloses a thermoplastic polyurethane resin, a polycarbonate diol is used as a diol. In PTL 2, a polyether carbonate diol is used as a diol.

CITATION LIST

Patent Literature

PTL 1: Japanese Unexamined Patent Application Publication No. 63-305127
PTL 2: Japanese Unexamined Patent Application Publication No. 2005-232447

SUMMARY OF INVENTION

Technical Problem

However, the polycarbonate diol in PTL 1 has a problem in that the polycarbonate diol exhibits high mixing viscosity with polyisocyanates and thus involves, for example, poor workability during resin molding. On the other hand, the polyether carbonate diol in PTL 2 has a problem in that a polyurethane resin prepared using the polyether carbonate diol has low glass transition temperature and thus limits the range of environments in which fiber-reinforced resins are used.

This invention has been made to solve the foregoing problems. An object of the invention is to provide a two-component curable composition, for manufacture of a thermoplastic polyurethane resin, that exhibits low mixing viscosity and high glass transition temperature after curing, a thermoplastic polyurethane resin that is a cured product thereof, and a fiber-reinforced resin including the thermoplastic polyurethane resin.

Solution to Problem (1) To solve the foregoing problems, a two-component curable composition for manufacture of a thermoplastic polyurethane resin according to the present invention is a two-component curable composition including a polyol component including a diol (A) and a polyisocyanate component including a diisocyanate (B). The diol (A) includes a diol (A-1) having an aromatic ring and having a molecular weight of 200 to 700 and a diol (A-2) having no aromatic ring and having a molecular weight of 500 or less. The ratio ((A-1)/((A-1)+(A-2))) of the mass of the diol (A-1) to the total mass of the diol (A-1) and the diol (A-2) is (10/100) to (75/100).

(7) In addition, a thermoplastic polyurethane resin according to the present invention includes a reaction product of the two-component curable composition for manufacture of a thermoplastic polyurethane resin.

(8) In addition, a fiber-reinforced resin according to the present invention includes the thermoplastic polyurethane resin and a reinforcing fiber.

Advantageous Effects of Invention

According to the present invention, it is possible to provide a two-component curable composition, for manufacture of a thermoplastic polyurethane resin, that can be used to form a thermoplastic polyurethane resin with high glass transition temperature despite low mixing viscosity, and also to provide the thermoplastic polyurethane resin and a fiber-reinforced resin including the thermoplastic polyurethane resin.

DESCRIPTION OF EMBODIMENTS

First, details of embodiments of the present invention will be listed and described.

(1) A two-component curable composition for manufacture of a thermoplastic polyurethane resin according to an embodiment of the present invention is a two-component curable composition including a polyol component including a diol (A) and a polyisocyanate component including a diisocyanate (B). The diol (A) includes a diol (A-1) having an aromatic ring and having a molecular weight of 200 to 700 and a diol (A-2) having no aromatic ring and having a molecular weight of 500 or less. The ratio ((A-1)/((A-1)+(A-2))) of the mass of the diol (A-1) to the total mass of the diol (A-1) and the diol (A-2) is (10/100) to (75/100).

Because of this configuration, a polyurethane resin with high glass transition temperature can be formed despite low mixing viscosity of the polyol component and the polyisocyanate component. Because of the low mixing viscosity, for example, the workability during resin molding can also be improved.

(2) Preferably, the diol (A-2) having no aromatic ring is at least one of an aliphatic diol and a diol having an oxyalkylene group.

Because of this configuration, a polyurethane resin having a higher glass transition temperature can be formed despite low mixing viscosity of the polyol component and the polyisocyanate component.

(3) Preferably, the diisocyanate (B) includes an aromatic diisocyanate (B-1).

Because of this configuration, a polyurethane resin having a higher glass transition temperature can be formed despite low mixing viscosity of the polyol component and the polyisocyanate component.

(4) Preferably, the diol (A-1) having an aromatic ring is an alkylene oxide adduct of bisphenol A.

Because of this configuration, a polyurethane resin having a higher glass transition temperature can be formed despite low mixing viscosity of the polyol component and the polyisocyanate component.

(5) Preferably, the polyol component further includes a porous powder (C).

Because of this configuration, a polyurethane resin having a higher glass transition temperature can be formed despite low mixing viscosity of the polyol component and the polyisocyanate component.

(6) Preferably, the two-component curable composition for manufacture of a thermoplastic polyurethane resin is used for manufacture of a fiber-reinforced resin.

Because of this configuration, which uses a two-component curable composition that exhibits low mixing viscosity for manufacture of a thermoplastic polyurethane resin, for example, the resin viscosity during molding can be reduced to a low level. Thus, the matrix resin exhibits improved flowability when combined with reinforcing fibers, so that the molding workability can be improved. In addition, the glass transition temperature of the resulting fiber-reinforced resin manufacture can be increased.

(7) A thermoplastic polyurethane resin according to an embodiment of the present invention includes a reaction product of the two-component curable composition for manufacture of a thermoplastic polyurethane resin.

Because of this configuration, which includes a reaction product of the polyol component and the polyisocyanate component of the two-component curable composition for manufacture of a thermoplastic polyurethane resin, the workability during mixing and molding is improved. In addition, the thermoplastic polyurethane resin has high glass transition temperature.

(8) A fiber-reinforced resin according to an embodiment of the present invention includes the thermoplastic polyurethane resin and a reinforcing fiber.

Because of this configuration, the workability during the manufacture of the fiber-reinforced resin is improved. In addition, the fiber-reinforced resin has high glass transition temperature.

In the present disclosure, "molecular weight" refers to number average molecular weight for compounds having molecular weight distributions, such as polypropylene glycol.

[Two-Component Curable Composition for Manufacture of Thermoplastic Polyurethane Resin]

A two-component curable composition for manufacture of a thermoplastic polyurethane resin according to an embodiment of the present invention is composed of at least a polyol component including a diol (A) and a polyisocyanate component including a diisocyanate (B). For example, the two-component curable composition is composed of two types of liquids that cure when mixed together and serves as a raw material for a resin.

[Polyol Component]

In the two-component curable composition for manufacture of a thermoplastic polyurethane resin according to the embodiment of the present invention, the polyol component includes the diol (A).

[Diol (A-1) Having Aromatic Ring]

The diol (A) according to the embodiment of the present invention includes a diol (A-1) having an aromatic ring and having a molecular weight of 200 to 700. The diol (A-1) having an aromatic ring is not particularly limited, except that the diol (A-1) has a molecular weight of 200 to 700.

For example, the diol (A-1) having an aromatic ring may be 4,4'-dihydroxydiphenyl ether, bisphenol S, bisphenol A, or 4,4'-dihydroxydiphenyl sulfone. The diol (A-1) having an aromatic ring may also be, for example, an alkylene oxide adduct of xylylene glycol, hydroquinone, 4,4'-biphenol, 4,4'-dihydroxydiphenyl ether, bisphenol S, bisphenol A, 4,4'-dihydroxydiphenyl sulfone, or the like. Examples of alkylene oxides include ethylene oxide, propylene oxide, butylene oxide, and a-olefin oxides. The diol (A-1) having an aromatic ring may include two or more of these compounds.

To increase the glass transition temperature of the resulting resin, it is preferred that the diol (A-1) having an aromatic ring be one having two or more benzene rings in one molecule, more preferably an alkylene oxide adduct of bisphenol A, even more preferably an ethylene oxide adduct or propylene oxide adduct of bisphenol A.

As mentioned above, the diol (A-1) having an aromatic ring has a molecular weight of 200 to 700. To increase the glass transition temperature of the resulting resin, it is preferred that the diol (A-1) having an aromatic ring have a molecular weight of 300 to 600, more preferably 350 to 500.

[Diol (A-2) Having No Aromatic Ring]

In addition to the diol (A-1) having an aromatic ring and having a molecular weight of 200 to 700, the diol (A) according to the embodiment of the present invention includes a diol (A-2) having no aromatic ring and having a molecular weight of 500 or less. The diol (A-2) having no aromatic ring may be, for example, an aliphatic diol, a diol having an oxyalkylene group, or an alicyclic diol, as described below. The diol (A-2) having no aromatic ring may include two or more of these compounds.

Examples of aliphatic diols according to the embodiment of the present invention include, but not limited to, ethylene glycol, 1,2-propanediol, 1,3-propanediol, 1,3-butanediol, 1,4-butanediol, 1,5-pentanediol, 1,6-hexanediol, neopentyl glycol, 3-methyl-1,5-pentanediol, 2-butyl-2-ethyl-1,3-propanediol, 2-methyl-1,3-propanediol, and 2-ethyl-1,3-hexanediol. The aliphatic diol according to the embodiment of the present invention may include two or more of these compounds.

It is particularly preferred that the aliphatic diol according to the embodiment of the present invention be 1,4-butanediol or 2-ethyl-1,3-hexanediol.

Examples of diols having an oxyalkylene group according to the embodiment of the present invention include, but not limited to, addition polymers of dihydric alcohols such as ethylene glycol, diethylene glycol, propylene glycol, dipropylene glycol, tripropylene glycol, 1,3-butanediol, and 1,4-butanediol with alkylene oxides such as ethylene oxide, propylene oxide, butylene oxide, and α-olefin oxides. The diol having an oxyalkylene group according to the embodiment of the present invention may include two or more of these compounds.

The diol having an oxyalkylene group according to the embodiment of the present invention is preferably an addition polymer of a dihydric alcohol with propylene oxide, more preferably dipropylene glycol or tripropylene glycol.

Examples of alicyclic diols according to the embodiment of the present invention include, but not limited to, 1,4-cyclohexanediol, 1,4-cyclohexanedimethanol, and hydrogenated bisphenol A.

As mentioned above, the diol (A-2) having no aromatic ring according to the embodiment of the present invention has a molecular weight of 500 or less. To reduce the mixing viscosity and increase the glass transition temperature of the resulting resin, it is preferred that the diol (A-2) having no aromatic ring have a molecular weight of 400 or less, more preferably 300 or less, even more preferably 200 or less, further preferably 100 or less.

To reduce the mixing viscosity and increase the glass transition temperature of the resulting resin, it is preferred in the embodiment of the present invention that the diol (A-1) having an aromatic ring be present in an amount of 10 to 80 parts by mass, more preferably 20 to 70 parts by mass, even more preferably 30 to 65 parts by mass, further preferably 40 to 60 parts by mass, based on 100 parts by mass of the diol (A).

To reduce the mixing viscosity and increase the glass transition temperature of the resulting resin, it is preferred in the embodiment of the present invention that the diol (A) be present in an amount of 80% by mass or more, more preferably 90% by mass or more, even more preferably 95% by mass or more, further preferably 98% by mass or more, of the polyol included in the polyol component. In the embodiment of the present invention, difunctional polyols, i.e., diol, are used as the polyol component for reaction with the polyisocyanate component to form a thermoplastic resin; however, polyols having a functionality of 3 or more may also be included as long as a thermoplastic resin is obtained.

In the embodiment of the present invention, the polyol component may include other compounds that cure by reacting with the diisocyanate (B), such as monools and polyamine compounds.

In the embodiment of the present invention, the ratio ((A-1)/((A-1)+(A-2))) of the mass of the diol (A-1) having an aromatic ring to the total mass of the diol (A-1) having an aromatic ring and the diol (A-2) having no aromatic ring is (10/100) to (75/100). To reduce the mixing viscosity and increase the glass transition temperature of the resulting resin, it is preferred that the ratio ((A-1)/((A-1)+(A-2))) be (20/100) to (65/100), more preferably (30/100) to (60/100), even more preferably (40/100) to (60/100).

[Polyisocyanate Component]

In the two-component curable composition for manufacture of a thermoplastic polyurethane resin according to the embodiment of the present invention, the isocyanate component includes the diisocyanate (B). Examples of diisocyanates (B) include, but not limited to, aliphatic diisocyanates, alicyclic diisocyanates, aromatic diisocyanates (B-1), and araliphatic diisocyanates. The diisocyanate (B) according to the embodiment of the present invention may include two or more of these compounds.

Examples of aliphatic diisocyanates according to the embodiment of the present invention include tetramethylene diisocyanate, dodecamethylene diisocyanate, hexamethylene diisocyanate, 2,2,4-trimethylhexamethylene diisocyanate, 2,4,4-trimethylhexamethylene diisocyanate, lysine diisocyanate, 2-methylpentane-1,5-diisocyanate, and 3-methylpentane-1,5-diisocyanate.

Examples of alicyclic diisocyanates according to the embodiment of the present invention include isophorone diisocyanate, hydrogenated xylylene diisocyanate, 4,4'-dicyclohexylmethane diisocyanate, 1,4-cyclohexane diisocyanate, methylcyclohexylene diisocyanate, and 1,3-bis(isocyanatomethyl)cyclohexane.

Examples of aromatic diisocyanates (B-1) according to the embodiment of the present invention include tolylene diisocyanate, diphenylmethane diisocyanate (MDI), 4,4'-dibenzyl diisocyanate, 1,5-naphthylene diisocyanate, xylylene diisocyanate, 1,3-phenylene diisocyanate, and 1,4-phenylene diisocyanate. Examples of diphenylmethane diisocyanates include 2,2'-diphenylmethane diisocyanate, 2,4'-diphenylmethane diisocyanate, and 4,4'-diphenylmethane diisocyanate.

Examples of araliphatic diisocyanates according to the embodiment of the present invention include dialkyldiphenylmethane diisocyanate, tetraalkyldiphenylmethane diisocyanate, and α,α,α,α-tetramethylxylylene diisocyanate.

The diisocyanate (B) according to the embodiment of the present invention may be a modified product such as an isocyanate group-terminated urethane prepolymer modified product resulting from a reaction of an isocyanate group-containing compound with a hydroxy group-containing compound or a carbodiimide modified product.

To reduce the mixing viscosity and increase the glass transition temperature of the resulting resin, it is preferred that the diisocyanate (B) according to the embodiment of the present invention be an aromatic diisocyanate (B-1), more preferably diphenylmethane diisocyanate or a carbodiimide modified product of diphenylmethane diisocyanate. A preferred diphenylmethane diisocyanate is 2,4'-diphenylmethane diisocyanate.

In the embodiment of the present invention, the diisocyanate (B) is preferably present in an amount of 80% by mass or more, more preferably 90% by mass or more, even more preferably 95% by mass or more, further preferably 98% by mass or more, of the polyisocyanate included in the polyisocyanate component. In the embodiment of the present invention, a difunctional isocyanate, i.e., a diisocyanate, is used as the polyisocyanate component for reaction with the polyol component to form a thermoplastic resin; however, polyisocyanates having a functionality of 3 or more may also be included as long as a thermoplastic resin is obtained.

In the embodiment of the present invention, an aromatic diisocyanate (B2) is preferably present in an amount of 80% by mass or more, more preferably 90% by mass or more, even more preferably 95% by mass or more, further preferably 98% by mass or more, of the diisocyanate (B).

[Porous Powder (C)]

To improve the tensile properties of the resin, specifically, a cured coating, the polyol component according to the embodiment of the present invention may include a porous powder (C). The porous powder (C) is preferably an inorganic porous powder, more preferably zeolite. The porous powder (C) is preferably used in an amount of 1 to 10 parts by mass, more preferably 2 to 8 parts by mass, even more preferably 3 to 7 parts by mass, based on 100 parts by mass of the polyol component.

[Two-Component Curable Composition]

The two-component curable composition for manufacture of a thermoplastic polyurethane resin (hereinafter also simply referred to as "two-component curable composition") according to the embodiment of the present invention includes the polyol component and the polyisocyanate component. The reaction of the polyol component with the polyisocyanate component forms a thermoplastic resin. That is, the two-component curable composition has the property of forming a thermoplastic resin as a reaction product. The two-component curable composition is a two-component curable resin composition including the polyol component as a first liquid and the polyisocyanate component as a second liquid. By mixing these first and second liquids together, both components can be reacted and cured.

The two-component curable composition according to the embodiment of the present invention may include a catalyst for promoting the reaction of the polyol component with the polyisocyanate component. As the catalyst, metal catalysts and amine-based catalysts that are commonly used for the manufacture of polyurethane resins can be used. Examples of metal catalysts include tin catalysts such as dibutyltin dilaurate, dioctyltin dilaurate, and dibutyltin dioctoate, lead catalysts such as lead octylate, lead octenoate, and lead naphthenate, and bismuth catalysts such as bismuth octylate and bismuth neodecanoate. Examples of amine-based catalysts include tertiary amine compounds such as triethylenediamine. These catalysts can be used alone or in combination.

In addition, the two-component curable composition according to the embodiment of the present invention may optionally include various additives such as plasticizers, flame retardants, antioxidants, hygroscopic agents, antifungal agents, silane coupling agents, defoaming agents, surface conditioners, and internal release agents.

In the two-component curable composition according to the embodiment of the present invention, the molar ratio of isocyanate groups to active hydrogen groups such as hydroxy groups (NCO/active hydrogen group) is not particularly limited and may be 0.5 or more, 0.6 or more, or 0.8 or more. The molar ratio (NCO/active hydrogen group) may also be 1.5 or less, 1.3 or less, or 1.2 or less.

The viscosity of the two-component curable composition according to the embodiment of the present invention in an environment at 25° C. after mixing for 5 minutes is not particular limited. As one example, the viscosity is preferably 700 mPa·s or less, more preferably 600 mPa·s or less, even more preferably 500 mPa·s or less, particularly preferably 300 mPa·s or less.

Although the two-component curable composition according to the embodiment of the present invention includes two liquids, namely, the first and second liquids, the two-component curable composition may include three or more liquids as long as the two-component curable composition includes at least two liquids.

[Thermoplastic Polyurethane Resin]

A thermoplastic polyurethane resin according to an embodiment of the present invention is a thermoplastic resin including a reaction product of the polyol component with the isocyanate component. In one embodiment, the thermoplastic polyurethane resin is obtained by reacting the two-component curable composition.

The glass transition temperature (Tg) of the polyurethane resin according to the embodiment of the present invention is not particularly limited. For example, the glass transition temperature is preferably 80° C. or higher, more preferably 100° C. or higher, even more preferably 120° C. or higher. There is no particular upper limit to the glass transition temperature. For example, the glass transition temperature may be 200° C. or higher.

[Fiber-Reinforced Resin]

A fiber-reinforced resin according to an embodiment of the present invention includes a thermoplastic polyurethane resin that is a cured product of the two-component curable composition described above and reinforcing fibers. Specifically, the thermoplastic polyurethane resin is used as a matrix resin for the fiber-reinforced resin.

The reinforcing fibers are not particularly limited. Examples of reinforcing fibers include carbon fibers, glass fibers, aramid fibers, alumina fibers, silicon carbide fibers, boron fibers, metal fibers, natural fibers, and mineral fibers. The reinforcing fibers may be composed of any one of these types of fibers or may be composed of a combination of two or more of these types of fibers. Of these, it is preferred that the reinforcing fibers be carbon fibers such as PAN-based, pitch-based, or rayon-based carbon fibers because of their high strength and stiffness and low weight. To improve the economic efficiency, it is preferred that the reinforcing fibers be glass fibers; therefore, it is more preferred that the reinforcing fibers include carbon fibers and glass fibers. Furthermore, to improve the properties such as shock absorption performance of the resulting molded article, it is preferred that the reinforcing fibers include aramid fibers. To improve the conductivity of the resulting molded article, it is also preferred that the reinforcing fibers be reinforcing fibers coated with a metal such as nickel.

The form of the reinforcing fibers is also not particularly limited. For example, the fiber-reinforced resin may be a homogeneous dispersion of finely cut fibers in a matrix resin or may be a sheet of oriented fibers, such as a woven fabric, a knitted fabric, or a nonwoven fabric, that is impregnated with a matrix resin.

The proportion of the reinforcing fibers relative to the matrix resin in the fiber-reinforced resin, that is, the fiber-reinforced composite material, is not particularly limited. As one example, from the viewpoint of mechanical properties such as strength, the volume of the reinforcing fibers per unit volume of the fiber-reinforced composite material is preferably 30% to 70%, more preferably 50% to 60%. In addition, the volume of the matrix resin per unit volume of the fiber-reinforced composite material is preferably 30% to 70%, more preferably 40% to 50%.

The method for manufacturing the fiber-reinforced resin according to the embodiment of the present invention is not particularly limited. As one example, the fiber-reinforced resin can be fabricated by coating and impregnating the reinforcing fibers with the two-component curable composition and then curing the two-component curable composition. The step of coating and impregnation with the two-component curable composition may be performed using a known method (e.g., a brush or roller). If necessary, the step of curing the two-component curable composition may be performed in a heated environment (e.g., at 60° C. to 180° C.), or in a reduced-pressure environment (e.g., 5 kPa or less). In this case, because the two-component curable composition described above is used for the fiber-reinforced resin according to the embodiment of the present invention, the workability during molding is improved.

The fiber-reinforced resin according to this embodiment is suitable as cases for electronic devices and is suitable to use for computers, televisions, cameras, audio players, and the like. The fiber-reinforced resin is also suitable for electrical and electronic component applications and is suitable to use for connectors, LED lamps, sockets, optical pickups, terminal boards, printed boards, speakers, small motors, magnetic heads, power modules, electric generators, electric motors, voltage transformers, current transformers, voltage regulators, rectifiers, inverters, and the like. The composite material is also suitable for components such as automotive components and vehicle-related components and is suitable to use for safety belt components, instrument panels, console boxes, pillars, roof rails, fenders, bumpers, door panels, roof panels, hood panels, trunk lids, door mirror stays, spoilers, hood louvers, wheel covers, wheel caps, garnishes, intake manifolds, fuel pumps, engine cooling water joints, window washer nozzles, wipers, battery peripheral components, wire harness connectors, lamp housings, lamp reflectors, lamp sockets, and the like. The fiber-reinforced resin is also suitable as building materials and is suitable to use for components for civil engineering structures, such as wall-, roof-, and ceiling-related components, window-related components, thermal insulation-related components, flooring-related components, seismic isolation and vibration control member-related components, lifeline-related components, and the like. The fiber-reinforced resin is also suitable as sporting goods and is suitable to use for golf-related goods such as golf club shafts and golf balls, sport racket-related goods such as tennis rackets and badminton rackets, sport protector goods such as masks, helmets, chest protectors, elbow protectors, and knee protectors for sports such as American football, baseball, and softball, fishing gear-related goods such as fishing rods, reels, and lures, winter sport-related goods such as those for ski and snowboard, and the like.

Advantageous Effects

According to an embodiment of the present invention, a thermoplastic resin with high glass transition temperature despite low resin viscosity during mixing and molding can be provided. Because of the low resin viscosity during molding, the matrix resin exhibits improved flowability when combined with reinforcing fibers, so that the molding workability can be improved.

In addition, if a thermoplastic resin with such a high glass transition temperature is used as a matrix resin for a fiber-reinforced composite material, the fiber-reinforced composite material can be processed with heat after curing. Accordingly, for example, a plate-shaped fiber-reinforced composite material may be fabricated in advance, and it can be processed with heat so as to have a curved shape, thus providing good processability. Furthermore, while the fiber-reinforced composite material can be processed with heat in this way, it has high glass transition temperature and thus exhibits improved heat resistance in actual use environments, so that a fiber-reinforced composite material with high heat resistance can be provided. Thus, the range of applications can be broadened to, for example, members near heat sources.

EXAMPLES

The present invention will be more specifically described with reference to the examples below, although the invention is not limited to the following examples, as long as there is no departure from the spirit thereof.

Two-component curable compositions of Examples 1 to 21 and Comparative Examples 1 to 4 were prepared according to the compositions (parts by mass) shown in Tables 1 and 2 below. Specifically, polyol components (first liquids) were prepared by mixing together the components other than polyisocyanate components. The resulting first liquids were adjusted to 25° C., and polyisocyanate components (second liquids) adjusted to 25° C. were added thereto, followed by mixing with stirring for 1 minute. The details of the components in Tables 1 and 2 are as follows.

[Diol (A-1) Having Aromatic Ring]
  A-1-1: propylene oxide adduct of bisphenol A (molecular weight: 360)
"ADEKA POLYETHER BPX-11" manufactured by ADEKA Corporation
  A-1-2: propylene oxide adduct of bisphenol A (molecular weight: 532)
"NEWPOL BP-5P" manufactured by Sanyo Chemical Industries, Ltd.
  A-1-3: ethylene oxide adduct of bisphenol A (molecular weight: 672)
"NEWPOL BPE-100" manufactured by Sanyo Chemical Industries, Ltd.
  (Material for comparison) A-1C: propylene oxide adduct of bisphenol A (molecular weight: 790)
"ADEKA POLYETHER BPX-55" manufactured by ADEKA Corporation
[Diol (A-2) Having No Aromatic Ring]
  A-2-1: 1,4-butanediol (molecular weight: 90)
"1,4-butanediol" manufactured by Mitsubishi Chemical Corporation
  A-2-2: dipropylene glycol (molecular weight: 134)
"dipropylene glycol" manufactured by AGC Inc.
  A-2-3: 2-ethyl-1,3-hexanediol (molecular weight: 146)
"2-ethyl-1,3-hexanediol" manufactured by KH Neochem Co., Ltd.
  A-2-4: tripropylene glycol (molecular weight: 192)
"tripropylene glycol" manufactured by AGC Inc.
  A-2-5: polypropylene glycol (molecular weight: 400)
"EXCENOL 420" manufactured by AGC Inc.
  (Material for comparison) A-2C: polypropylene glycol (molecular weight: 1,000)
"EXCENOL 1020" manufactured by AGC Inc.
[Aromatic Diisocyanate (B-1)]
  B-1-1: MDI (mixture of 4,4'-MDI and 2,4'-MDI (50%:50%))
"Lupranate MI" manufactured by BASF INOAC Polyurethanes Ltd.
  B-1-2: MDI (4,4'-MDI)
"Millionate MT" manufactured by Tosoh Corporation
  B-1-3: carbodiimide modified MDI (mixture of carbodiimide modified product of 4,4'-MDI with 4,4'-MDI (25%:75%))
"Lupranate MM-103" manufactured by BASF INOAC Polyurethanes Ltd.
[Porous Powder (C)]
  C-1: zeolite
"Molecular Sieve 3AB" manufactured by Union Showa K.K.
[Other Material (D)]
  D-1: dioctyltin dilaurate (metal catalyst)
"NEOSTANN U810" manufactured by Nitto Kasei Co., Ltd.
[Evaluation]

The two-component curable compositions of Examples 1 to 21 and Comparative Examples 1 to 4 were evaluated for mixing viscosity, glass transition temperature (Tg), tensile strength, thermal melting temperature, the flexural strength of fiber-reinforced resins, and the impact strength of fiber-reinforced resins by the following evaluation methods. The results are shown in Tables 1 and 2.

(1) Mixing Viscosity (mPa·s)

Each of the mixtures was allowed to stand in an environment at 25° C., and the viscosity was measured after 5 minutes from the start of mixing. The viscosity was measured with a BM-type viscometer (manufactured by Toki Sangyo Co., Ltd.) in accordance with JIS K 7117-1.

(2) Glass Transition Temperature (° C.)

Each of the mixtures was applied at a thickness of 1 mm when 5 minutes elapsed after mixing. This was treated at 120° C. for 1 hour to obtain a polyurethane resin sheet. A test specimen with a size of 5 mm×2 cm was cut from the resulting resin sheet, and the glass transition temperature was measured with a Rheogel E-4000 manufactured by UBM Co., Ltd. in accordance with JIS K 7244-4.

(3) Tensile Strength (MPa)

A polyurethane resin sheet with a thickness of 1 mm was obtained in the same manner as that for glass transition temperature. A test specimen with a size of 5 mm×4 cm was cut from the resulting sheet, and the tensile strength (MPa) was measured with a digital universal tester (Instron 5581) manufactured by Instron Japan Co., Ltd. in accordance with JIS A 6021-2011.

(4) Thermal Melting Temperature

A polyurethane resin sheet with a thickness of 1 mm was obtained in the same manner as that for glass transition temperature. A test specimen with a size of 1 mm×1 mm was cut from the resulting sheet, and the ½ method temperature was measured with a flowability tester (Shimadzu Flow Tester CFT-500D) manufactured by Shimadzu Corporation in accordance with JIS K 7210.

(5) Flexural Strength of Fiber-Reinforced Resin (CFRP)

Plain-woven fabrics of carbon fibers were stacked on top of each other on a product mold, were covered with a release film, and were sealed and vacuum-packed, and the resin was then poured and cured at 120° C. for 1 hour to form a fiber-reinforced resin molded body with a thickness of 2 mm. A test specimen with a size of 100 mm×15 mm×2 mm was cut from the resulting molded body, and the three-point flexural strength was measured with a precision universal tester (Shimadzu Autograph AG-X plus) in accordance with JIS K 7074.

(6) Charpy Impact Test (Impact Strength) of Fiber-Reinforced Resin

A fiber-reinforced resin molded body with a thickness of 2 mm was obtained in the same manner as that for flexural strength. A test specimen with a size of 80 mm×10 mm×2 mm was cut from the resulting molded body, and the Charpy impact strength was measured with a motorized pendulum tester (Instron MPX series motorized pendulum tester) in accordance with JIS K 7077.

TABLE 1

| | | | | Ex. 1 | Ex. 2 | Ex. 3 | Ex. 4 | Ex. 5 | Ex. 6 | Ex. 7 |
|---|---|---|---|---|---|---|---|---|---|---|
| Composition | Polyol component | A-1 | A-1-1 (molecular weight: 360) | 50 | 50 | 50 | | | 50 | 50 |
| | | | A-1-2 (molecular weight: 532) | | | | 50 | | | |
| | | | A-1-3 (molecular weight: 672) | | | | | 50 | | |
| | | | (A-1C (molecular weight: 790)) | | | | | | | |
| | | A-2 | A-2-1 (molecular weight: 90) | 25 | | | 25 | 25 | 50 | |
| | | | A-2-2 (molecular weight: 134) | | 25 | | | | | |
| | | | A-2-3 (molecular weight: 146) | | | | | | | |
| | | | A-2-4 (molecular weight: 192) | | | 25 | | | | 50 |
| | | | A-2-5 (molecular weight: 400) | 25 | 25 | 25 | 25 | 25 | | |
| | | | (A-2C (molecular weight: 1000)) | | | | | | | |
| | | C-1 | | 5 | 5 | 5 | 5 | 5 | 5 | 5 |
| | | D-1 | | 0.002 | 0.002 | 0.002 | 0.002 | 0.002 | 0.002 | 0.002 |
| | Polyisocyanate component | B-1 | B-1-1 | 120 | 100 | 84 | 110 | 104 | 170 | 100 |
| | | | B-1-2 | | | | | | | |
| | | | B-1-3 | | | | | | | |
| Proportion Evaluation | (A − 1)/((A − 1) + (A − 2)) | | | 50/100 | 50/100 | 50/100 | 50/100 | 50/100 | 50/100 | 50/100 |
| | Mixing viscosity (mPa · s) | | | 200 | 200 | 100 | 230 | 150 | 500 | 100 |
| | Glass transition temperature (° C.) | | | 110 | 110 | 85 | 88 | 81 | 132 | 100 |
| | Tensile strength (MPa) | | | 55 | 51 | 45 | 46 | 47 | 54 | 46 |
| | Thermal melting temperature (° C.) | | | 205 | 202 | 180 | 160 | 155 | 210 | 195 |
| | Flexural strength of CFRP (GPa) | | | 56 | 53 | 58 | 46 | 47 | 43 | 42 |
| | Charpy impact test of CFRP (kJ/m$^2$) | | | 240 | 230 | 265 | 190 | 188 | 171 | 175 |

| | | | | Ex. 8 | Ex. 9 | Ex. 10 | Ex. 11 | Ex. 12 | Ex. 13 |
|---|---|---|---|---|---|---|---|---|---|
| Composition | Polyol component | A-1 | A-1-1 (molecular weight: 360) | 50 | | | 50 | 50 | 50 |
| | | | A-1-2 (molecular weight: 532) | | | | | | |
| | | | A-1-3 (molecular weight: 672) | | 50 | 50 | | | |
| | | | (A-1C (molecular weight: 790)) | | | | | | |
| | | A-2 | A-2-1 (molecular weight: 90) | | 50 | | 25 | 25 | 25 |
| | | | A-2-2 (molecular weight: 134) | | | | | | |
| | | | A-2-3 (molecular weight: 146) | 50 | | | | | |
| | | | A-2-4 (molecular weight: 192) | | | 50 | | | |
| | | | A-2-5 (molecular weight: 400) | | | | 25 | 25 | 25 |
| | | | (A-2C (molecular weight: 1000)) | | | | | | |
| | | C-1 | | 5 | 5 | 5 | 5 | 5 | |
| | | D-1 | | 0.002 | 0.002 | 0.002 | 0.002 | 0.002 | 0.002 |
| | Polyisocyanate component | B-1 | B-1-1 | 120 | 154 | 84 | 60 | | 120 |
| | | | B-1-2 | | | | 60 | | |
| | | | B-1-3 | | | | | 140 | |
| Proportion Evaluation | (A − 1)/((A − 1) + (A − 2)) | | | 50/100 | 50/100 | 50/100 | 50/100 | 50/100 | 50/100 |
| | Mixing viscosity (mPa · s) | | | 90 | 250 | 80 | 600 | 550 | 200 |
| | Glass transition temperature (° C.) | | | 81 | 87 | 80 | 115 | 111 | 104 |
| | Tensile strength (MPa) | | | 48 | 45 | 46 | 51 | 46 | 45 |
| | Thermal melting temperature (° C.) | | | 187 | 185 | 154 | 211 | 208 | 185 |
| | Flexural strength of CFRP (GPa) | | | 44 | 44 | 43 | 46 | 44 | 43 |
| | Charpy impact test of CFRP (kJ/m$^2$) | | | 182 | 179 | 184 | 185 | 174 | 186 |

TABLE 2

| | | | | Ex. 14 | Ex. 15 | Ex. 16 | Ex. 17 | Ex. 18 | Ex. 19 | Ex. 20 |
|---|---|---|---|---|---|---|---|---|---|---|
| Composition | Polyol component | A-1 | A-1-1 (molecular weight: 360) | 50 | 50 | 70 | 20 | 70 | 20 | 70 |
| | | | A-1-2 (molecular weight: 532) | | | | | | | |
| | | | A-1-3 (molecular weight: 672) | | | | | | | |
| | | | (A-1C (molecular weight: 790)) | | | | | | | |
| | | A-2 | A-2-1 (molecular weight: 90) | 5 | 45 | | | 30 | 80 | 20 |
| | | | A-2-2 (molecular weight: 134) | | | | | | | |
| | | | A-2-3 (molecular weight: 146) | | | | | | | |
| | | | A-2-4 (molecular weight: 192) | | | | | | | |

TABLE 2-continued

| | | | | | | | | | | |
|---|---|---|---|---|---|---|---|---|---|---|
| | | | A-2-5 (molecular weight: 400) | 45 | 5 | 30 | 80 | | | 10 |
| | | | (A-2C (molecular weight: 1000)) | | | | | | | |
| | | C-1 | | 5 | 5 | 5 | 5 | 5 | 5 | 5 |
| | | D-1 | | 0.002 | 0.002 | 0.002 | 0.002 | 0.002 | 0.002 | 0.002 |
| | Polyisocyanate component | B-1 | B-1-1 | 76 | 160 | 66 | 64 | 130 | 240 | 110 |
| | | | B-1-2 | | | | | | | |
| | | | B-1-3 | | | | | | | |
| Proportion | (A − 1)/((A − 1) + (A − 2)) | | | 50/100 | 50/100 | 70/100 | 20/100 | 70/100 | 20/100 | 70/100 |
| Evaluation | Mixing viscosity (mPa · s) | | | 60 | 600 | 600 | 70 | 600 | 500 | 600 |
| | Glass transition temperature (° C.) | | | 81 | 121 | 86 | 80 | 136 | 126 | 108 |
| | Tensile strength (MPa) | | | 44 | 44 | 51 | 41 | 54 | 50 | 56 |
| | Thermal melting temperature (° C.) | | | 146 | 210 | 228 | 138 | 238 | 217 | 221 |
| | Flexural strength of CFRP (GPa) | | | 53 | 43 | 52 | 41 | 47 | 44 | 51 |
| | Charpy impact test of CFRP (kJ/m$^2$) | | | 218 | 190 | 207 | 260 | 184 | 171 | 218 |

| | | | | Ex. 21 | Comp. Ex. 1 | Comp. Ex. 2 | Comp. Ex. 3 | Comp. Ex. 4 |
|---|---|---|---|---|---|---|---|---|
| Composition | Polyol component | A-1 | A-1-1 (molecular weight: 360) | 20 | | 50 | 80 | 5 |
| | | | A-1-2 (molecular weight: 532) | | | | | |
| | | | A-1-3 (molecular weight: 672) | | | | | |
| | | | (A-1C (molecular weight: 790)) | | 50 | | | |
| | | A-2 | A-2-1 (molecular weight: 90) | 40 | 25 | | 10 | 50 |
| | | | A-2-2 (molecular weight: 134) | | | | | |
| | | | A-2-3 (molecular weight: 146) | | | | | |
| | | | A-2-4 (molecular weight: 192) | | | | | |
| | | | A-2-5 (molecular weight: 400) | 40 | 25 | | 10 | 45 |
| | | | (A-2C (molecular weight: 1000)) | | | 50 | | |
| | | C-1 | | 5 | 5 | 5 | 5 | 5 |
| | | D-1 | | 0.002 | 0.002 | 0.002 | 0.002 | 0.002 |
| | Polyisocyanate component | B-1 | B-1-1 | 150 | 100 | 48 | 90 | 170 |
| | | | B-1-2 | | | | | |
| | | | B-1-3 | | | | | |
| Proportion | (A − 1)/((A − 1) + (A − 2)) | | | 20/100 | 50/100 | 50/100 | 80/100 | 5/100 |
| Evaluation | Mixing viscosity (mPa · s) | | | 500 | 90 | 140 | 2200 | 2000 |
| | Glass transition temperature (° C.) | | | 103 | 61 | 67 | 120 | 74 |
| | Tensile strength (MPa) | | | 47 | 21 | 18 | 26 | 24 |
| | Thermal melting temperature (° C.) | | | 204 | 146 | 186 | 230 | 178 |
| | Flexural strength of CFRP (GPa) | | | 53 | 24 | 21 | N/A | N/A |
| | Charpy impact test of CFRP (kJ/m$^2$) | | | 241 | 135 | 125 | N/A | N/A |

The two-component curable compositions of Examples 1 to 21 had low mixing viscosity, and the resulting thermoplastic resins had high glass transition temperature. In particular, it was found that a higher glass transition temperature was achieved when the diol (A-1) having an aromatic ring had a molecular weight of 200 to 500 and the diol (A-2) having no aromatic ring had a molecular weight of 120 or less. In addition, the resulting thermoplastic polyurethane resins had a certain tensile strength.

It was also found that the fiber-reinforced resins in which the cured products of the two-component curable compositions of Examples 1 to 21 were used as matrix resins had a certain flexural strength and impact strength. This demonstrates that a two-component curable composition according to an embodiment of the present invention is suitable for the manufacture of fiber-reinforced resins.

In contrast, in Comparative Examples 1 to 4, it was impossible to simultaneously achieve a reduction in mixing viscosity and an increase in glass transition temperature. In addition, in Comparative Examples 3 and 4, it was impossible to impregnate the reinforcing fibers because of excessive mixing viscosity, and therefore, it was impossible to evaluate the flexural strength and the impact strength.

Although some embodiments of the present invention have been described above, these embodiments are given by way of example and are not intended to limit the scope of the invention. These embodiments can be practiced in various other forms, and various omissions, substitutions, and changes can be made without departing from the spirit of the invention. These embodiments and omissions, substitutions, changes, and the like made thereto come within the scope and spirit of the invention and also similarly come within the scope of the invention set forth in the claims and equivalents thereof.

The invention claimed is:

1. A two-component curable composition for manufacturing a thermoplastic polyurethane resin, comprising:
  a polyol component including a diol; and
  a polyisocyanate component including a diisocyanate,
  wherein the diol including a diol having an aromatic ring and having a molecular weight of 200 to 700 and a diol having no aromatic ring and having a molecular weight of 500 or less such that a mass ratio of the diol having the aromatic ring to a total mass of the diol having the aromatic ring and the diol having no aromatic ring is in a range of 40/100 to 75/100 wherein the diol having an aromatic ring is an alkylene oxide adduct of bisphenol A.

2. The two-component curable composition for manufacturing a thermoplastic polyurethane resin according to claim 1, wherein the diol having no aromatic ring is at least one of an aliphatic diol and a diol having an oxyalkylene group.

3. The two-component curable composition for manufacturing a thermoplastic polyurethane resin according to claim 1, wherein the diisocyanate includes an aromatic diisocyanate.

4. The two-component curable composition for manufacturing a thermoplastic polyurethane resin according to claim 1, wherein the polyol component further includes a porous powder.

5. A two-component curable composition for manufacturing a fiber-reinforced resin, comprising:
the two-component curable composition of claim 1.

6. A thermoplastic polyurethane resin, comprising:
a reaction product of the two-component curable composition of claim 1.

7. A fiber-reinforced resin, comprising:
the thermoplastic polyurethane resin of claim 6; and
a reinforcing fiber.

8. The two-component curable composition for manufacturing a thermoplastic polyurethane resin according to claim 2, wherein the diisocyanate includes an aromatic diisocyanate.

9. The two-component curable composition for manufacturing a thermoplastic polyurethane resin according to claim 2, wherein the diol having an aromatic ring is an alkylene oxide adduct of bisphenol A.

10. The two-component curable composition for manufacturing a thermoplastic polyurethane resin according to claim 2, wherein the polyol component further includes a porous powder.

11. A two-component curable composition for manufacturing a fiber-reinforced resin, comprising:
the two-component curable composition of claim 2.

12. A thermoplastic polyurethane resin, comprising:
a reaction product of the two-component curable composition of claim 2.

13. A fiber-reinforced resin, comprising:
the thermoplastic polyurethane resin of claim 12; and
a reinforcing fiber.

14. The two-component curable composition for manufacturing a thermoplastic polyurethane resin according to claim 3, wherein the diol having an aromatic ring is an alkylene oxide adduct of bisphenol A.

15. The two-component curable composition for manufacturing a thermoplastic polyurethane resin according to claim 3, wherein the polyol component further includes a porous powder.

16. A two-component curable composition for manufacturing a fiber-reinforced resin, comprising:
the two-component curable composition of claim 3.

17. A thermoplastic polyurethane resin, comprising:
a reaction product of the two-component curable composition of claim 3.

18. A fiber-reinforced resin, comprising:
the thermoplastic polyurethane resin of claim 17; and
a reinforcing fiber.

19. The two-component curable composition for manufacturing a thermoplastic polyurethane resin according to claim 1, wherein the polyol component further includes a porous powder.

* * * * *